Figure 1:
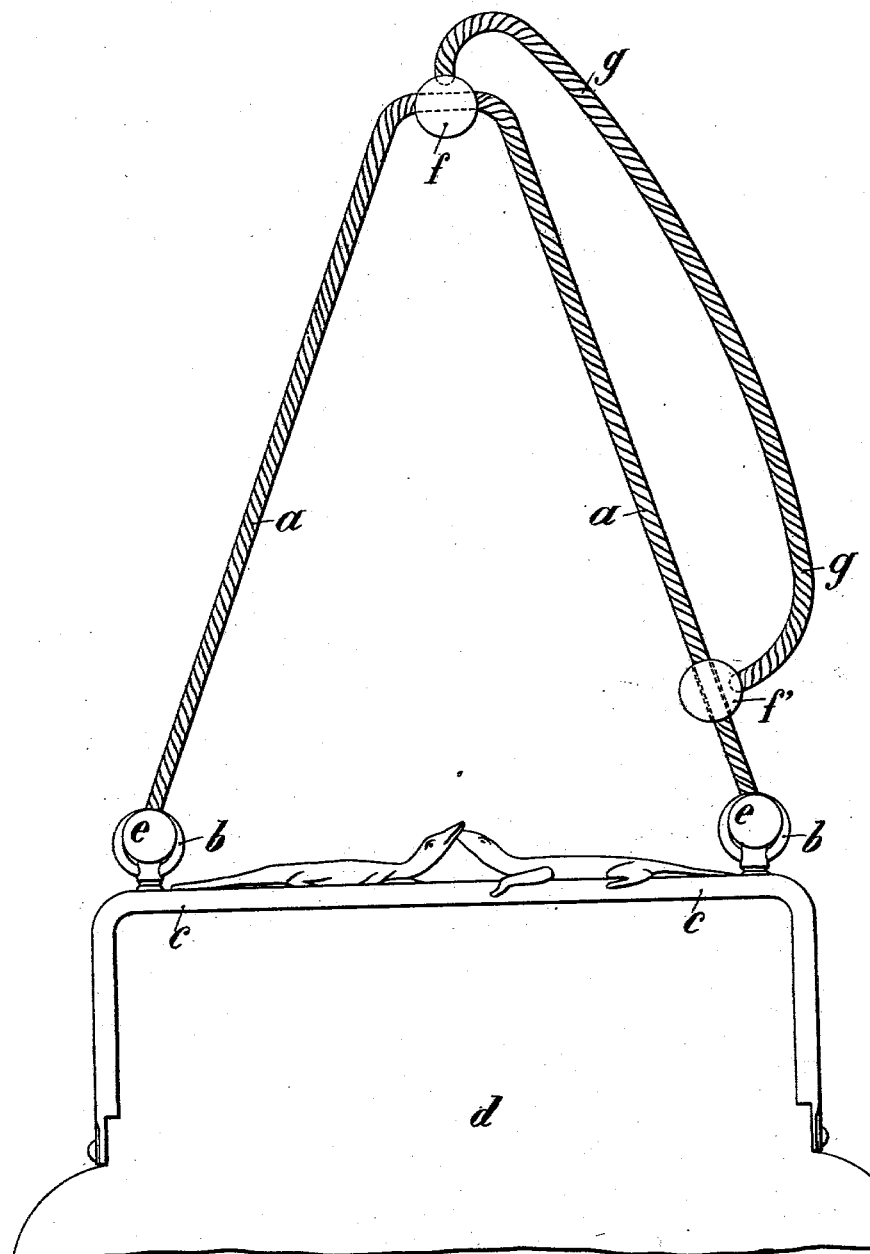

No. 744,151. PATENTED NOV. 17, 1903.
A. AMSON.
BAG, RETICULE, OR THE LIKE.
APPLICATION FILED MAY 2, 1902.
NO MODEL. 2 SHEETS—SHEET 1.

WITNESSES:
W. M. Avery
Theo. G. Hoster

INVENTOR
Arthur Amson
BY
ATTORNEYS

No. 744,151. PATENTED NOV. 17, 1903.
A. AMSON.
BAG, RETICULE, OR THE LIKE.
APPLICATION FILED MAY 2, 1902.
NO MODEL. 2 SHEETS—SHEET 2.
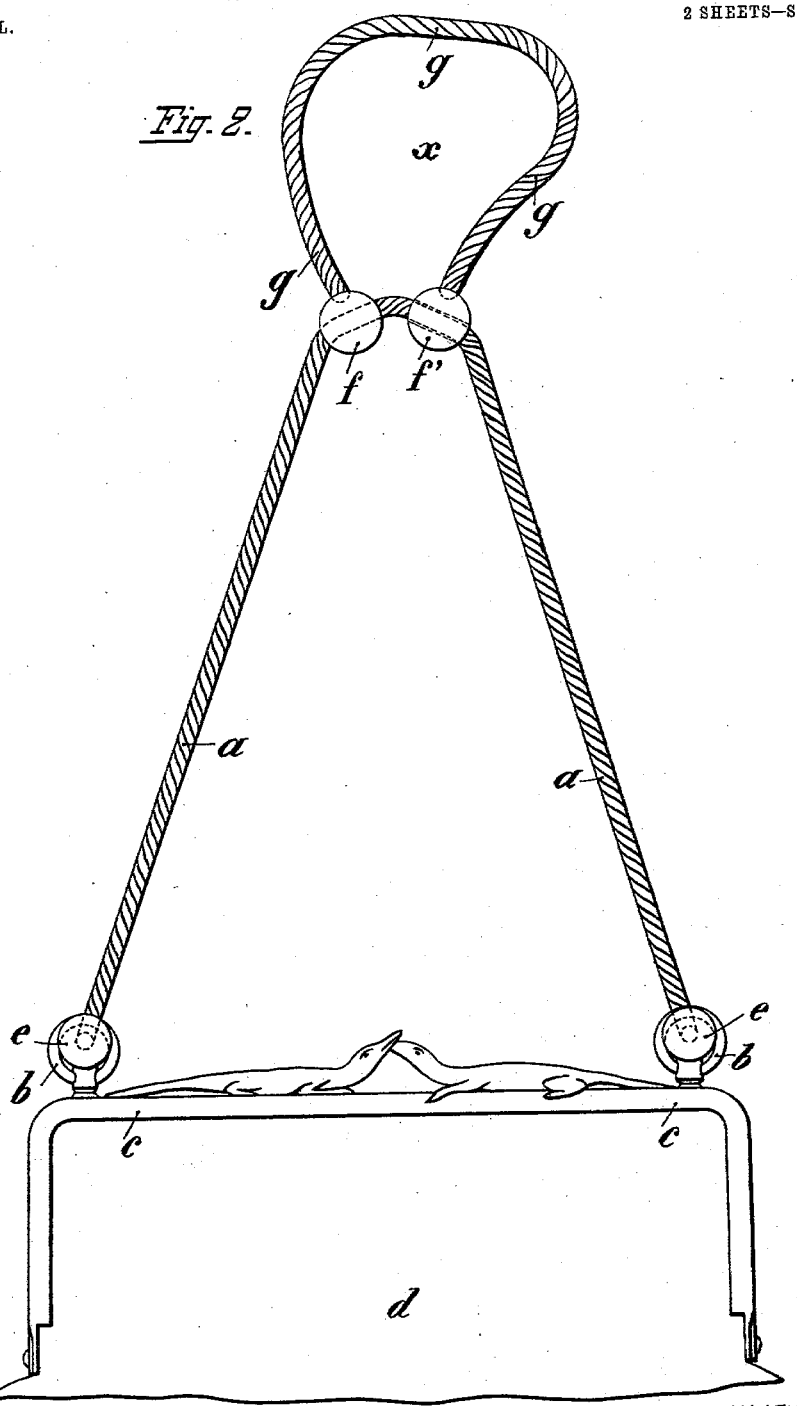
WITNESSES: W. M. Avery, Theo. J. Hoster
INVENTOR Arthur Amson
BY ATTORNEYS No. 744,151. Patented November 17, 1903.

UNITED STATES PATENT OFFICE.

ARTHUR AMSON, OF PARIS, FRANCE.

BAG, RETICULE, OR THE LIKE.

SPECIFICATION forming part of Letters Patent No. 744,151, dated November 17, 1903.

Application filed May 2, 1902. Serial No. 105,617. (No model.)

*To all whom it may concern:*

Be it known that I, ARTHUR AMSON, manufacturer of morocco goods, of 68 Rue de la Folie Méricourt, in the city of Paris, Republic of France, have invented Improvements in and Relating to Bags, Reticules, and the Like, of which the following is a full, clear, and exact description.

This invention relates to bags, reticules, and the like, and has for its object an improved suspension device whereby danger of loss by accident or theft is obviated.

The invention consists in the features and combination and arrangement of parts hereinafter described, and particularly pointed out in the claims.

Figure 1 shows a portion of a lady's handbag fitted with my improved suspension device, the same being in its disengaged position. Fig. 2 shows the same in the position as carried upon the wrist of a person.

Similar letters indicate corresponding parts in both figures.

According to my invention my improved suspension device comprises a holder $a$, formed of a small chain or cord, the two ends of which engage the suspension-rings $b$, fixed to the frame $c$ of the bag $d$. The suspension chain or cord $a$ is furnished at each end with a ball $e$, suitably attached thereto, and the diameter of these balls $e$ is such as to prevent them passing through the suspension-rings $b$. Upon the said chain or cord $a$ two other balls $f$ and $f'$ are threaded. The ball $f$ is appropriately fixed upon the chain or cord $a$, while the ball $f'$ is free to slide thereon. To the balls $f$ and $f'$ are fixed—by brazing, for example—the extremities of a short chain or flexible cord $g$, and it is in the loop $x$ thus formed that the person introduces the wrist. The weight of the bag naturally causes the ball $f'$ to approach the ball $f$ in such a manner that the arrangement forms a kind of running loop or bracelet which closes automatically. When the two balls $f$ and $f'$ are brought close together, the bag is secured to the wrist in an absolutely safe manner and the frame portions $c$ of the bag are always in a perfectly horizontal position.

My improved suspending device can also be used to retain every article which is ordinarily carried by hand, such as fans, spectacles, or opera-glass with handle, and the like. I can also apply my improved device to chains for the neck in order to keep such chains exactly in the middle of the body.

The forms, details, accessories, materials, and dimensions of the safety suspension device hereinbefore described may obviously be varied without altering the nature of the invention.

I claim—

1. The combination with the handle of a bag, of a ball fixedly secured to the handle at about its middle, a cord or chain having one end secured to said ball, and a second ball to which the other end of the cord or chain is secured, mounted to slide on the handle so as to automatically approach the fixed ball when the bag is being carried by said cord, as set forth.

2. The combination with a bag, of a flexible connnection having its ends connected with the bag, and a second flexible connection having one end fixed to the first-named flexible connection and its other end slidably connected therewith, substantially as described.

The foregoing specification of my improvements in and relating to bags, reticules, and the like signed by me this 22d day of April, 1902.

ARTHUR AMSON.

Witnesses:
 EDWARD P. MACLEAN,
 MAURICE H. PIGNET.